United States Patent Office 3,219,567
Patented Nov. 23, 1965

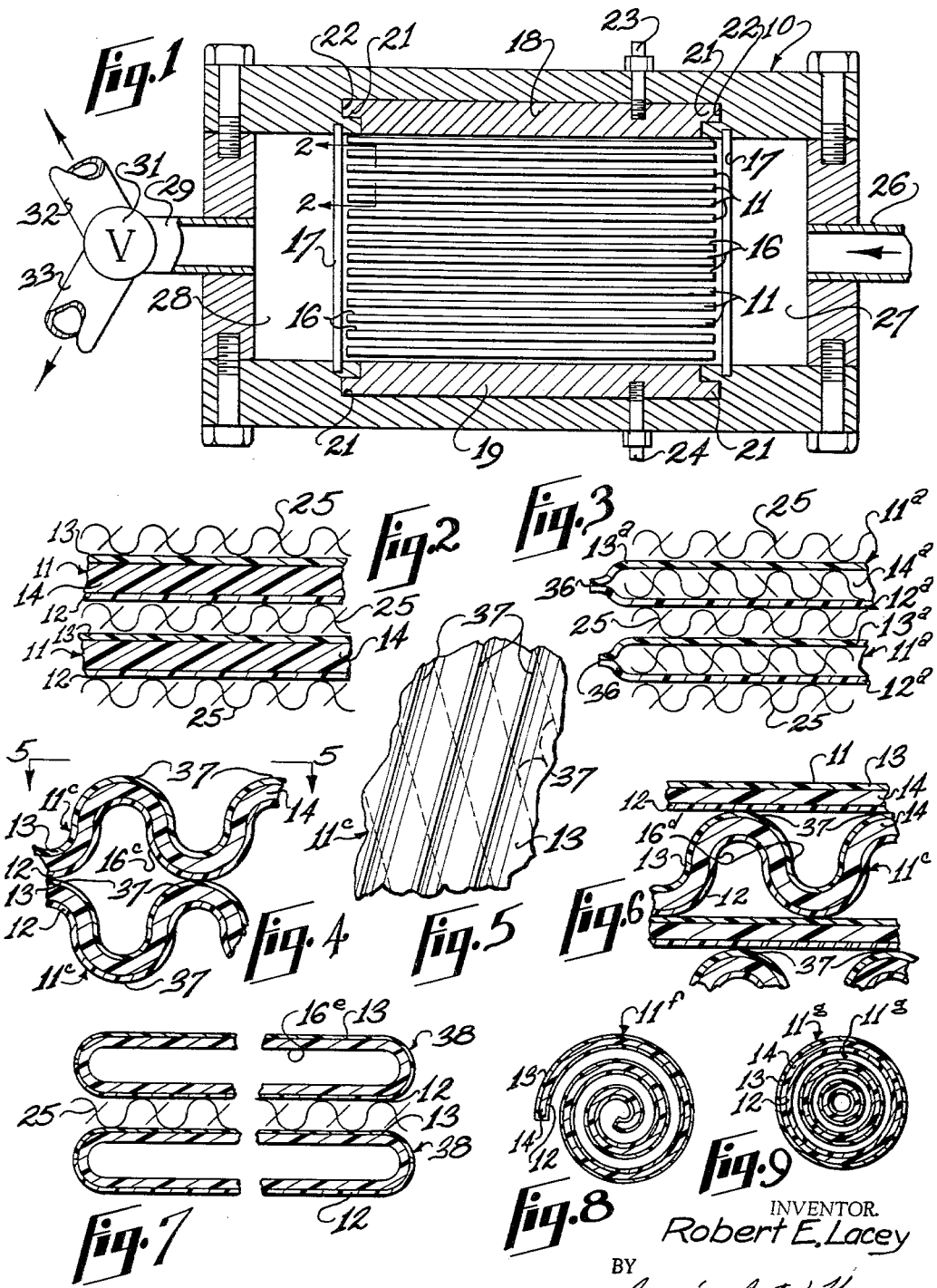

3,219,567
PROCESS AND APPARATUS FOR REMOVING
ELECTROLYTES FROM SOLUTIONS
Robert E. Lacey, Birmingham, Ala., assignor to Southern
Research Institute, a corporation of Alabama
Filed Mar. 4, 1964, Ser. No. 349,430
16 Claims. (Cl. 204—180)

This invention was made during the performance of a contract with the United States Government, Office of Saline Water.

This invention relates to a process and apparatus for removing electrolytes from solutions and more particularly to such a process and apparatus which shall be adapted for demineralizing water.

An object of my invention is to provide a process and apparatus for removing electrolytes from solutions in which a barrier of very low electrical resistance is employed to separate concentrated solutions on the inside of electrosorption membrane assemblies from dilute, or purified solutions on the outside of electrosorption membrane assemblies, whereby for any given electrical driving force the rate of electrolyte transfer is high and the energy input per unit of electrolyte removed is very low.

Another object of my invention is to provide a process and apparatus for removing electrolytes from solutions in which there is no necessity for providing separate containers for the concentrated and dilute, or purified solutions due to the fact that the separation is accomplished by sorbing the electrolyte from the solution to be purified, and subsequently desorbing the electrolyte into a waste stream.

Another object of my invention is to provide a process and apparatus of the character designated in which no special manifolds are required since dilute solutions and concentrated solutions are never discharged from the apparatus at the same time.

A further object of my invention is to provide a process and apparatus of the character designated in which a minimum amount of the product solution is lost due to hold up of the product solution within the apparatus during the times of voltage reversal.

A still further object of my invention is to provide apparatus for removing electrolytes from solutions which shall be simple of construction, economical of manufacture, and one which is particularly adapted for demineralizing saline water.

Briefly, my improved process comprises passing a solution containing the electrolyte adjacent electrosorption membrane assemblies each of which is provided with a cation-permeable surface in spaced relation to an anion-permeable surface. A current of electricity is passed through the solution in a direction to transfer the cations in the solution through the cation-permeable selective surface into the interior of the electrosorption membrane assembly and to transfer the anions in the solution through the anion-permeable selective surface inwardly of the membrane assembly whereby the electrolyte is sorbed from the solution. The solution from which the electrolyte has been sorbed is removed continuously until the electrolyte is concentrated within the membrane assembly. The direction of flow of the current of electricity through the system of membrane assemblies and solution is then reversed to desorb the cations and anions out of the membrane assembly into the solution whereby the resulting solution then becomes concentrated with the electrolyte. The resulting solution which is concentrated with the electrolyte is then removed until the apparatus is made ready for another cycle of sorbing electrolyte.

Apparatus embodying features of my invention and which may be employed to carry out my improved process is illustrated in the accompanying drawing, forming a part of this application, in which:

FIG. 1 is a vertical sectional view showing diagrammatically one embodiment of my improved apparatus;

FIG. 2 is an enlarged, fragmental view taken generally along the line 2—2 of FIG. 1;

FIG. 3 is an enlarged, fragmental view showing a modified form of my invention;

FIG. 4 is an enlarged fragmental view showing another modified form of my invention in which the outer surfaces of adjacent electrosorption membrane assemblies are corrugated to define a passageway therebetween for passing a solution;

FIG. 5 is a fragmental plan view taken generally along the line 5—5 of FIG. 4;

FIG. 6 is an enlarged, fragmental view showing a further modified form of my invention in which alternate one of the electrosorption membrane assemblies are corrugated;

FIG. 7 is a sectional view showing another modified form of my invention in which each electrosorption membrane assembly is formed from a flattened tube having one surface thereof coated with a material which imparts anion exchange characteristics and the opposite surface thereof coated with a material which imparts cation exchange characteristics;

FIG. 8 is a sectional view showing another form of my invention in which the solution is adapted to flow in a spiral path; and, FIG. 9 is a sectional view showing a still further modified form of my invention in which the electrosorption membrane assemblies are arranged concentrically.

Referring now to the drawing for a better understanding of my invention, I show a housing 10 having an internal chamber for receiving the solution from which the electrolyte is to be removed. Mounted within the housing 10 in stacked relation to each other are a plurality of electrosorption membrane assemblies 11. Each membrane assembly 11 comprises a cation-permeable layer 12 in spaced relation to an anion-permeable layer 13. In FIGS. 1 and 2, the layers 12 and 13 are shown as being separated by a solution and electrolyte-permeable inner layer 14.

In FIG. 2, the inner, permeable layer 14 is shown as being a sheet of dialysis cellulose which has been swollen in zinc chloride solution to increase the void volume of the inner layer. The conventional method of treating cellophane with zinc chloride is disclosed by J. W. McBain and R. F. Stuewer, J. Phys. Chem. 40 1157 (1936).

In FIG. 2, the cation-permeable layer 12 and the anion-permeable layer 13 are formed by applying anion and cation resins on opposite faces of the permeable layer 14. Preferably, the coating resins for the layers 12 and 13 are of the condensation type whereby they may be cured upon applying heat. Prior to applying the resin coatings 12 and 13, the base or inner layer 14 is preferably soaked in an aqueous solution of glycerol whereby the structure of the film does not collapse upon applying heat to cure the coatings. That is, if the cellulose 14 is not soaked in glycerol, it becomes brittle and increases in resistance during the curing process. In actual practice, I have found that a 35% aqueous solution of glycerol is satisfactory for soaking the cellulose inner layer 14.

To form the electrosorption membrane assembly 11, the inner layer of cellulose 14 is secured to a plate, such as a stainless steel plate, and the glycerol solution is wiped from the surface thereof. A solution or dispersion of a coating resin is then applied to one surface thereof and cured thereon. The position of the sheet of cellulose 14 on the plate is then reversed and the other resin coating is applied and then cured.

A satisfactory cation-permeable resin which may be employed for applying the coating 12 to the inner layer of cellulose 14 is made up of the following ingredients:

| Ingredient: | Molar proportions |
|---|---|
| Phenol | 1.0 |
| p-Phenosulphonic acid (sodium salt) | 0.2 |
| Sodium hydroxide | 0.5 |
| Formaldehyde (as 37% aqueous solution) | 1.5 |
| Water | 5.5 |

The ingredients are mixed, and heated at 85° centigrade for 2 hours prior to application.

A satisfactory anion-permeable resin which may be employed to apply the coating 13 to the inner layer 14 comprises the following ingredients:

| Ingredient: | Molar proportions |
|---|---|
| Guanidine nitrate | 1.50 |
| Melamine | 0.22 |
| Formaldehyde (as 37% aqueous solution) | 4.1 |
| Ammonium carbonate | 0.12 |
| Water | 3.8 |

These ingredients are heated at 80° C. for 40 minutes prior to application.

The coating films 12 and 13 are applied by any suitable means, such as by spraying. In actual experiments, the films with the cation-resin coating were heated at 60° C. for 45 minutes in an oven with air circulating over the surface to remove as much of the water from the resin as possible. If the water is not removed bubbles are formed later when the resin is cured. After drying, the coated films are cured at a temperature of approximately 110° C. in a steam atmosphere. The cation-permeable coating was cured for about 100 minutes to develop good electro-chemical properties. Heating for less time than this resulted in lower transference numbers, but heating for longer times did not harm the coating or the film.

The anion-permeable coatings were applied in a manner similar to that just described relative to the cation-resin coatings. The anion-permeable coatings were cured at approximately 150° for one hour.

The electro-chemical properties of the coated films and the inner permeable layer 14 are approximately as follows:

| Material | Cation Transference No.[a] | Resistance,[b] ohm-cm.[2] |
|---|---|---|
| Cellophane inner layer | 0.48 | 14.0 |
| Anion-permeable layer plus cellophane inner layer | 0.04 | 10.0 |
| Cation-permeable layer plus cellophane inner layer | 0.98 | 19.0 |

[a] Measured between 0.12N and 0.06N NaCl solution.
[b] Equilibrated in 0.06N NaCl solution.

In actual practice, I find that the thickness of the coatings 12 and 13 may vary from approximately 14 to 18 microns and the inner film of cellophane 14 may vary in thickness from approximately 25 microns to 250 microns. However, I do not desire to be limited to these specific ranges.

As shown in FIG. 1, the electrosorption membrane assemblies 11 are spaced from each other so as to provide narrow passages 16 between adjacent membrane assemblies whereby the solution can flow between all membrane assemblies. The stack of membrane assemblies 11 may be maintained in alignment with each other by providing indexing members 17 adjacent opposite ends of the membrane assemblies 11, as shown in FIG. 1. All anion-permeable selective surfaces 13 of the membrane assemblies 11 face in one direction whereas all of the cation-permeable selective surfaces 12 face in the opposite direction. Electrodes 18 and 19 are mounted within the housing 10 adjacent opposite sides of the membrane assemblies 11, as shown. Preferably, the electrodes are provided with projections 21 adjacent the ends thereof disposed to engage suitable recesses 22 formed in the housing whereby the electrodes are locked in place. Electrical current is supplied to the electrodes 18 and 19 by lead-ins 23 and 24, respectively.

The electrosorption membrane assemblies 11 are held in spaced relation to each other by suitable means, such as by providing an open-mesh fabric 25 between adjacent membrane assemblies, as shown in FIG. 2. In actual practice, I have found that available porous materials, such as leno-weave cloth or other types of porous fabrics are satisfactory in every respect.

The solution carrying the electrolyte is introduced into the housing by a supply conduit 26. As shown in FIG. 1, the ends of the membrane assemblies 11 are spaced from the adjacent ends of the housing 10 to define an inlet manifold 27 and an outlet manifold 28. The outlet manifold 28 communicates with a discharge conduit 29 having a control valve 31 therein. The control valve 31 is adapted to be moved to selected positions whereby the solution from which the electrolyte has been removed is discharged through a conduit 32 and the solution containing concentrated electrolyte is discharged through a conduit 33.

From the foregoing description, the operation of the apparatus shown in FIGS. 1 and 2 will be readily understood. The solution containing the electrolyte is introduced through the conduit 26 into the manifold 27 whereupon it flows through the passageways between adjacent membrane assemblies 11 to the discharge manifold 28. Initially, the voltage applied to the electrodes 18 and 19 is in a direction such that the cations in the solution are transferred through the cation-permeable faces 12 of the membrane assemblies 11. These cations are blocked from leaving the membrane assemblies 11 by the anion-permeable faces 13 of the membrane assemblies. Simultaneously, anions are transferred through the anion-permeable faces 13 of the membrane assemblies 11 and are blocked by the cation-permeable faces. In this way, the dissolved salts are transferred into the membrane assemblies 11 and are held under the influence of the applied voltage and the solution is depleted in dissolved salts as it flows through the passages 16. The solution from which the electrolyte has thus been removed is then discharged through valve 31 to conduit 32.

After the apparatus has been in operation for a sufficient length of time for a concentration of the electrolyte to build up within the membrane assemblies 11, the applied voltage is reversed and the control valve 31 is actuated to discharge the solution through conduit 33, whereupon it may go into waste lines or to a suitable receptacle therefor. Under the influence of the reversed voltage, the cations and anions are transferred out of the membrane assemblies into the solution in the passages 16 through the cation-permeable faces 12 and the anion-permeable faces 13, respectively. These ions thus enter the solution in the passages 16 and are trapped in the solution because they cannot permeate the face of the next membrane assembly 11, which is opposite in nature to the membrane face the ions permeate. Accordingly, the solution becomes concentrated in dissolved salts and the interiors of the membrane assemblies 11 are depleted of salts and are made ready for sorbing another load of dissolved salts. Thereupon, the applied voltage is again reversed and another cycle of sorption-desorption is commenced.

Referring now to FIG. 3 of the drawings, I show a modified form of my invention in which an electrosorption membrane assembly 11[a] is made by placing a porous or permeable inner layer 14[a] between an anion-exchange member 13[a] and a cation-exchange member 12[a]. The edges of the membranes 12[a] and 13[a] are sealed to each other as at 36 by suitable means, such as an adhesive. The epoxy cements are satisfactory for this purpose. Adjacent membrane assemblies 11ª are separated from each other by providing a porous or open-mesh material 25 therebetween, as described above.

The inner layer 14ª may be in the form of dialysis cellophane as described hereinabove or it may be in the form of a porous open-mesh material, such as leno-weave fabric. Commercially available ion-exchange membranes may be employed as the outer layers 12ª and 13ª in the electrosorption membrane assembly 11ª. In view of the fact that such ion-exchange membranes are well known in the art, no further description thereof is deemed necessary.

To improve the conductivity of the inner layer 14 of 14ª, as the case may be, the inner layer may be in the form of a film that has a large number of fixed positively and negatively charged groups, such as quaternized amine groups and sulfonic acid groups, in or on its polymeric network. These groups make the inner permeable layer highly conductive to electrolyte solutions.

In FIGS. 4 and 5 of the drawing, I show a modified form of my invention in which the electrosorption membrane assemblies 11ᶜ are provided with corrugations 37 whereby the adjacent corrugations engage each other at their peaks to define fluid passageways 16ᶜ for receiving the solution, as described hereinabove. Preferably, the corrugations of one membrane assembly are positioned at an angle relative to the corrugations or the adjacent membrane assembly, as shown in FIG. 5, whereby there is no chance of the peaks slipping inwardly of the adjacent grooves. Accordingly, by providing this structure the porous supporting structure 25 may be eliminated. The electrosorption membrane assembly 11ᶜ is provided with an electrolyte and solution permeable inner layer 14, as described hereinabove. Also, one surface of the inner layer 14 is coated with a cation-permeable resin 12 whereas the other surface thereof is coated with an anion-permeable resin 13.

Referring now to FIG. 6 of the drawing, I show another form of my invention in which a corrugated electrosorption membrane assembly 11ᶜ is interposed between each electrosorption membrane assembly 11, as described hereinabove. Accordingly, the corrugation 37 of the membrane assembly 11ᶜ engages the adjacent surface of the membrane assembly 11 whereby passageways 16ᵈ are defined therebetween for receiving the solution, thereby eliminating the necessity for the porous supporting structure 25 between adajcent membrane assemblies.

In FIG. 7 of the drawing, I show another form of my invention in which each electrosorption membrane assembly comprises a flattened tube-like member 38 which is permeable to the solution and the electrolyte. One surface of the tube 38 is coated with the cation-permeable resin 12 whereas the other surface thereof is coated with the anion-permeable resin 13. The inner surface of the flat tube 38 defines a passageway 16ᵉ for receiving the solution, as described hereinabove. The side walls of the flattened tube 38, together with the solution passing therethrough maintain the walls of the tubes in spaced relation to each other, as shown. Adjacent tubes 38 are spaced from each other by providing a suitable supporting structure 25, as described hereinabove.

Referring now to FIG. 8 of the drawing, I show an electrosorption membrane assembly 11ᶠ which is in the form of a spiral. The membrane assembly comprises an inner porous film 14 having a cation-permeable resin 12 adjacent one side thereof and an anion-permeable resin 13 at the other side thereof. The solution may be transferred from the outside of the spiral toward the inner end thereof or from the inside to the outer end. Also, the solution may be transferred at right angles to the convolutions. The electrodes are so mounted relative to the spiral as to cause sorption of the electrolyte within the membrane assemblies 11ᶠ when the current is flowing in one direction and to desorb the electrolyte from the membrane assemblies into the passageways between the convolutions of the spiral when the current is flowing in the opposite direction.

In FIG. 9 of the drawing, I show a still further modified form of my invention in which a plurality of concentrically arranged electrosorption membrane assemblies 11ᵍ are provided. Each membrane assembly is provided with an inner permeable film 14 having a cation-permeable film 12 adjacent one side thereof and an anion-permeable film 13 adjacent the other side thereof. The solution is passed between the concentric membrane assemblies and the electrodes are so mounted as to cause sorption of the electrolyte within the membrane assemblies 11ᵍ when the current is flowing in one direction and to desorb the electrolyte from the membrane assemblies into the passageways between the concentrically arranged membranes when the current is flowing in the opposite direction.

In actual practice, I have found that the time required to desorb the electrolyte from the electrosorption membrane assemblies is approximately one-fourth to one-third of the time required to sorb the electrolyte into the membrane assemblies. Also, with the process described hereinabove, feed water containing 3500 parts per million of sodium chloride can be demineralized to produce water containing 400 parts per million. Another important result obtained in accordance with my process is that little product water need be lost due to hold-up of solution within the demineralizer during the times of voltage reversal. For example, with a 36-minute demineralization cycle no more than one minute's production of demineralized water need be lost. It is believed that on a commercial scale there would be a loss of only about 0.3% of the product water during the time of voltage reversal.

From the foregoing, it will be seen that I have devised an improved process and apparatus for removing electrolytes from solutions. By providing a barrier of very low electrical resistance to separate concentrated solutions from dilute, or purified solutions, the rate of electrolyte transfer is relatively high and the energy input per unit of electrolyte removed is very low. Also, by sorbing the electrolytes from the solution and then subsequently desorbing the electrolytes into a waste stream, there is no necessity for providing separate channels or compartments for concentrated and dilute or purified solutions. Furthermore, since the dilute and concentrated solutions are never discharged from the apparatus at the same time, there is no necessity for complicated manifolds.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. The process for removing electrolytes from solutions which comprises the steps of:
    (a) passing a solution containing the electrolyte adjacent imperforate, sheet-like electrosorption membrane assemblies held in spaced relation to each other and each having a cation-permeable selective surface in spaced and in generally parallel relation to an anion-permeable selective surface with adjacent membrane assemblies having cation-permeable surfaces opposite anion-permeable surfaces and with an enclosed electrolyte ion and solution permeable inner layer therebetween,
    (b) passing a current of electricity through the solution and the electrosorption membrane assemblies so as to pass substantially all of said current through said electrosorption membrane assemblies in a direction to transfer the cations in the solution through the cation permeable surface into said membrane assemblies and to transfer the anions in the solution through the anion-permeable surface into said membrane assemblies whereby the electrolyte is sorbed from the solution, (c) removing the solution from which the electrolyte has been sorbed, (d) reversing the direction of flow of the current of electricity through the solution and the electrosorption membrane assemblies so that substantially all of said current flows through said electrosorption membrane assemblies and desorbs the cations and anions out of said membrane assemblies into the solution whereby the resulting solution becomes concentrated with electrolyte, and (e) removing said resulting solution which is concentrated with electrolyte.

2. The process for removing electrolytes from solutions as defined in claim 1 in which the direction of flow of the current of electricity through the solution to desorb the ions out of the membrane assemblies is reversed for a period of time of approximately ¼ to ⅓ of the time employed to sorb the electrolyte from the solution.

3. Apparatus for removing electrolytes from solutions comprising:

(a) imperforate, sheet-like electrosorption membrane assemblies each having a cation-permeable selective surface in spaced and in generally parallel relation to an anion-permeable selective surface with an enclosed electrolyte ion and solution permeable inner layer therebetween.

(b) said membrane assemblies being held in spaced relation to each other such that adjacent membrane assemblies have cation-permeable surfaces opposite and in spaced relation to anion-permeable surfaces to define continuous passageways therebetween, (c) means to pass a solution containing the electrolyte between adjacent membrane assemblies, (d) means to pass a current of electricity through the solution and the electrosorption membrane assemblies in a direction to pass substantially all of said current through said electrosorption membrane assemblies and transfer the cations in the solution through the cation-permeable surfaces into said inner layer of each membrane assembly and to transfer the anions in the solution through the anion-permeable surfaces into said inner layer of each membrane assembly whereby the electrolyte is sorbed from the solution and transferred into the inner layers of the membrane assemblies, (e) means to remove from between the membrane assemblies the solution from which the electrolyte has been sorbed, and (f) means to reverse the direction of flow of the current of electricity through the solution and the electrosorption membrane assemblies so that substantially all of said current passes through said electrosorption membrane assemblies and desorbs the cations and anions out of said membrane assemblies into the solution then between the membrane assemblies whereby the resulting solution becomes concentrated with the electrolyte and the membrane assemblies are depleted of the electrolyte and made ready for another cycle of sorbing electrolyte, and (g) means to remove said resulting solution from between said membrane assemblies.

4. Apparatus as defined in claim 3 in which a plurality of the membrane assemblies are supported in a housing having electrodes at opposite sides thereof, and means is provided to introduce the solution adjacent one end of the membrane assemblies and to remove the solution adjacent the other end of the membrane assemblies.

5. Apparatus as defined in claim 4 in which the means to introduce and remove the solution comprises a manifold adjacent said one end of the membrane assemblies in communication with a supply conduit and a manifold adjacent said other end of the membrane assemblies in communication with a discharge conduit.

6. Apparatus as defined in claim 5 in which the discharge conduit communicates with a discharge valve which in turn communicates selectively with means to receive solution from which the electrolyte has been removed and the solution having concentrated electrolyte therein.

7. Apparatus as defined in claim 3 in which the inner layer comprises dialysis cellophane.

8. Apparatus as defined in claim 7 in which the cellophane has been swollen in zinc chloride solution.

9. Apparatus as defined in claim 3 in which the electrosorption membrane assembly comprises:

(a) a solution-and-electrolyte-permeable inner layer,
(b) a cation-permeable resin bonded to one side of said inner layer, and
(c) an anion-permeable resin bonded to the other side of said inner layer.

10. Apparatus as defined in claim 9 in which the inner layer comprises dialysis cellophane which has been soaked in glycerol prior to bonding the resin thereto.

11. Apparatus as defined in claim 3 in which the inner layer comprises a porous fabric.

12. Apparatus as defined in claim 3 in which the outer edges of the cation-permeable selective surface and the outer edge of the anion-permeable selective surface are sealed to each other.

13. Apparatus as defined in claim 3 in which the inner layer includes fixed positively and negatively charged groups selected from the group consisting of quaternized amine groups and sulfonic acid groups to improve the ion exchange characteristics and reduce electrical resistance.

14. Apparatus as defined in claim 3 in which each electrosorption membrane assembly comprises:

(a) a flattened tube permeable to the electrolyte,
(b) a coating on one side of said tube of a material that imparts anion exchange characteristics to said one side, and
(c) a coating on the other side of said tube of a material that imparts cation exchange characteristics to said other side.

15. Apparatus as defined in claim 3 in which the outer surface of the electrosorption membrane assembly is corrugated to define a passageway between adjacent membrane assemblies for passing the solution.

16. Apparatus as defined in claim 3 in which adjacent electrosorption membrane assemblies are held in spaced relation to each other by an open, mesh-like material.

References Cited by the Examiner

UNITED STATES PATENTS

| | | | |
|---|---|---|---|
| 2,854,393 | 9/1958 | Kollsman | 204—180 |
| 2,970,098 | 1/1961 | Ellis | 204—301 |

JOHN H. MACK, *Primary Examiner.*